Aug. 12, 1924.

L. SAUVÉ ET AL

COMBINED BROODER AND GREENHOUSE

Filed Jan. 26, 1922

INVENTORS

Aug. 12, 1924.

L. SAUVÉ ET AL

COMBINED BROODER AND GREENHOUSE

Filed Jan. 26, 1922    7 Sheets-Sheet 3

INVENTORS

Aug. 12, 1924.

L. SAUVÉ ET AL

COMBINED BROODER AND GREENHOUSE

Filed Jan. 26, 1922     7 Sheets-Sheet 5

L. SAUVÉ ET AL 1,504,721

COMBINED BROODER AND GREENHOUSE

Filed Jan. 26, 1922   7 Sheets-Sheet 6

Lucien Nedin
Léon Sauvé
INVENTORS

Patented Aug. 12, 1924.

1,504,721

UNITED STATES PATENT OFFICE.

LÉON SAUVÉ, OF RIDGEFIELD, CONNECTICUT, AND LUCIEN ARDIN, OF NEW YORK, N. Y.

COMBINED BROODER AND GREENHOUSE.

Application filed January 26, 1922. Serial No. 531,932.

*To all whom it may concern:*

Be it known that we, LÉON SAUVÉ and LUCIEN ARDIN, citizens of the United States, residing, respectively, at Ridgefield, Fairfield County, Connecticut, and 121 West 26th Street, New York city, New York, have invented certain new and useful Improvements in Combined Brooders and Greenhouses, of which the following is a specification.

This invention relates to a combination of brooder and greenhouse and more particularly to one in which the brooders will reduce to a minimum the loss of baby chicks in raising them.

In accordance with the invention the hens are exercised and taken care of to such an extent that each year the maximum number of eggs for hatching purposes is produced, the means employed being such that hens do not stop laying.

Usually at the end of the hatching period, with other brooders, considerable losses of chicks are sustained. Many die in the brooder and the hatching eggs which in time would develop into chickens are ruined, causing financial losses, owing to the defects in the brooders.

In accordance with the invention, the combined brooder and greenhouse is constructed so that the air breathed by baby chicks is the same as that to which chicks are accustomed. The chicks live among vegetables and plants in their natural, hereditary environment. This natural plant atmosphere has a great influence upon the well being of the chicks. Vegetation, we know, has a great influence on the air and its composition. Vegetables have not the same respiration as animals nor is this respiration the same at night as during the day. Vegetation absorbs the carbonic acid expelled by the chicks and spreads odors and emanations into the atmosphere. In accordance with the invention we maintain and preserve the natural atmosphere and environment of the chicks and maintain the natural temperature, moisture and gas content of the atmosphere in which the chicks live. We eliminate the absolute dryness which would cause the legs of the chicks to dry up and cripple them. The advantage derived by baby chicks by living alongside flowers and plants, is reciprocal to the plants. Plants absorb carbonic acid which is in the atmosphere, decompose it, absorbing the caloric energy and transform the carbon into cell structure. By placing chicks near the plants the carbonic gas breathed out by the chicks is supplied to the plants, which as can be shown, favors the growth of the plant.

In order to afford the young chicks the opportunity, in a measure, to live in contact with vegetables and plants, in a natural manner, we have provided a combined brooder in the shape of a small building which is at the same time a greenhouse. The heat necessary for the breeding of chicks is also utilized for the development of plant life. This structure has been created with a view to permitting the chicks to enjoy the beneficial effects of plant moisture produced within its confines.

This structure has been erected in a symmetrical shape giving both vegetation and chicks exposure in all directions, i. e. north, south, east and west, and in intermediary directions as well.

All acute angles have been eliminated—a most important feature because of the well known tendency of young chicks under unfavorable temperature to fall back and pile into small recesses and angles, thus invariably causing fatalities by crushing one another.

The structure has been planned also with a view to permitting the raising of vegetation in such a way that when the critical chick-raising period has terminated, the young plants have become suitable for transplanting into hot beds or into the open when the incubating season and weather permit. The structure can be transformed into a colony house and later into a laying house.

Another important feature in connection with the construction of these houses, is the isolation of one from the other. The advantage of this feature is perhaps most marked and beneficial in the event of epidemics among young chicks. The ravages from this cause by reason of said isolation are, by this invention, reduced to a minimum.

With the same object in mind a manner of construction has been provided enabling one to take it apart and put it together again quickly, without damage, and to move it from the infected to a clean place and also to disinfect its different parts prior to reinstallation.

Another object of the invention is to economize in construction, by standardization. For this reason the component parts of the brooders are as much as possible uniform in shape and size. This is accomplished by making the panels alike except the one used by the door. All boards used are of standard shape and size.

The structure is neat in appearance, a kind of booth which can be used singly or in groups and which also could be part of an installation de luxe, pleasing to the eye and at the same time useful and practical.

The invention is illustrated in the accompanying drawings in which.

In accordance with the invention the floor, roof and sides are each specially constructed and are built on a unit system. Parts are standard and are interchangeable.

The structure is round or of polygonal shape with enough sides to eliminate sharp corners. Square or triangular floor shapes are not practical because they produce sharp corners. Pentagonal, hexagonal and even seven-sided shapes can be used for small brooders, and for large brooders shapes with numerous sides, such as twelve-sided shapes, can be used.

In the form illustrated the brooder is octagonal, with eight sides. It is easier to build and less costly than if of round shape, and it produces open angles so that the baby chicks therein will not be subjected to the risk of being crushed or smothered by trampling on one another, but will be able to diverge right or left away from the angles.

Means are provided for rapidly assembling the brooder and for taking it apart. The building consists of floor 5, sides 6 and roof 7. In one of the eight sides of the octagon brooder is a door 2. Each of the remaining seven sides has a window 3 and a trap door 4. The floor consists of a double flooring; the boards of one floor or layer 8 cross the boards of the other floor or layer. The boards are grooved at 10 and between the two floors a sheet of asbestos 50 is laid acting as a nonconductor of heat, thus maintaining an even temperature. It also prevents moulding as well as ingress of germs from the ground into the brooder. It is also used in other parts of the building to help tighten and to help join the large parts of the frame, etc.

The double floor is laid on a frame plan 11 according to whether or not the building is stationary or portable. In a stationary brooder there is an octagonal frame 12; the angles 13 are assembled and the sides 14 are tightened by parallel pieces 15.

In the case of the portable brooder, the floor consists of eight separate panels. The double floors of each panel are set on angular frames, the sides 16 of which radiate from the center and are joined by a half-thickness joint to the framing 17 which forms the exterior edge of the triangle. In the center of the floor the triangular sections meet and the sides of the frames are sharpened to enter into the center piece 18 with which they all join and upon which they rest.

For the manufacture of the brooders in large quantities, the block 19 (Fig. 10) is made of cast iron, with pockets or recesses 20 in which are placed the extremities of the radiating parts 16. This insures solidity and expedites the taking apart of the building.

Figure 6:
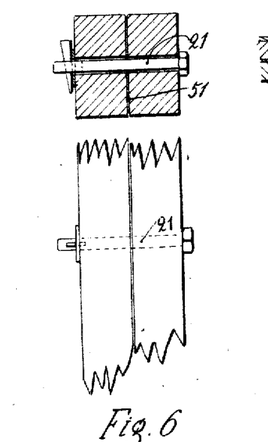
Fig. 6 shows the assembling in detail of the bolts and cotter pins of the principal wooden parts of the side panels, of the floor and roof of the brooder.

The sides 16 of the eight triangles composing the demountable floor, are assembled and tightened together by bolts and cotter pins 21 (Fig. 6) which tighten them on and against each other, after placing a sheet of asbestos 51 in the joint between the two neighboring sides 16.

To assemble, the eight triangles are placed upside down, the flooring is placed on the bottom, and then the floor is turned bottom up and placed on its foundation.

The foundation naturally depends on the nature of the soil. It can be made very simply. For instance, it can be made up of (9) earthen pipes or tubes sunk in the ground and filled with concrete 22, one for the center part to rest on and one for each angle.

The roof. The roof is built in a manner similar to the floor. It consists of pieces of wood 23 radiating from a center and on a convenient incline, carrying two floorings 24, 25 made up of boards 26, with tongues and grooves, laid crossing each other, the tongues and grooves running in opposite directions in the two floorings. A sheet of asbestos 52 is laid between the two floorings.

Parts 23 are cut on the bias at their ends and laid on the upper edge 27 of the sides and are preferably cut out as at 28 so that they fit, rest on and lean against the edges.

The extremities 29 of the pieces 23 are set in a cut or opening on the outer circumference of the center piece made with a piece of wood forming the center piece 30. A hole in that center piece permits a pipe or chimney 31 to go thru.

Figures 2, 3, 10, 11:
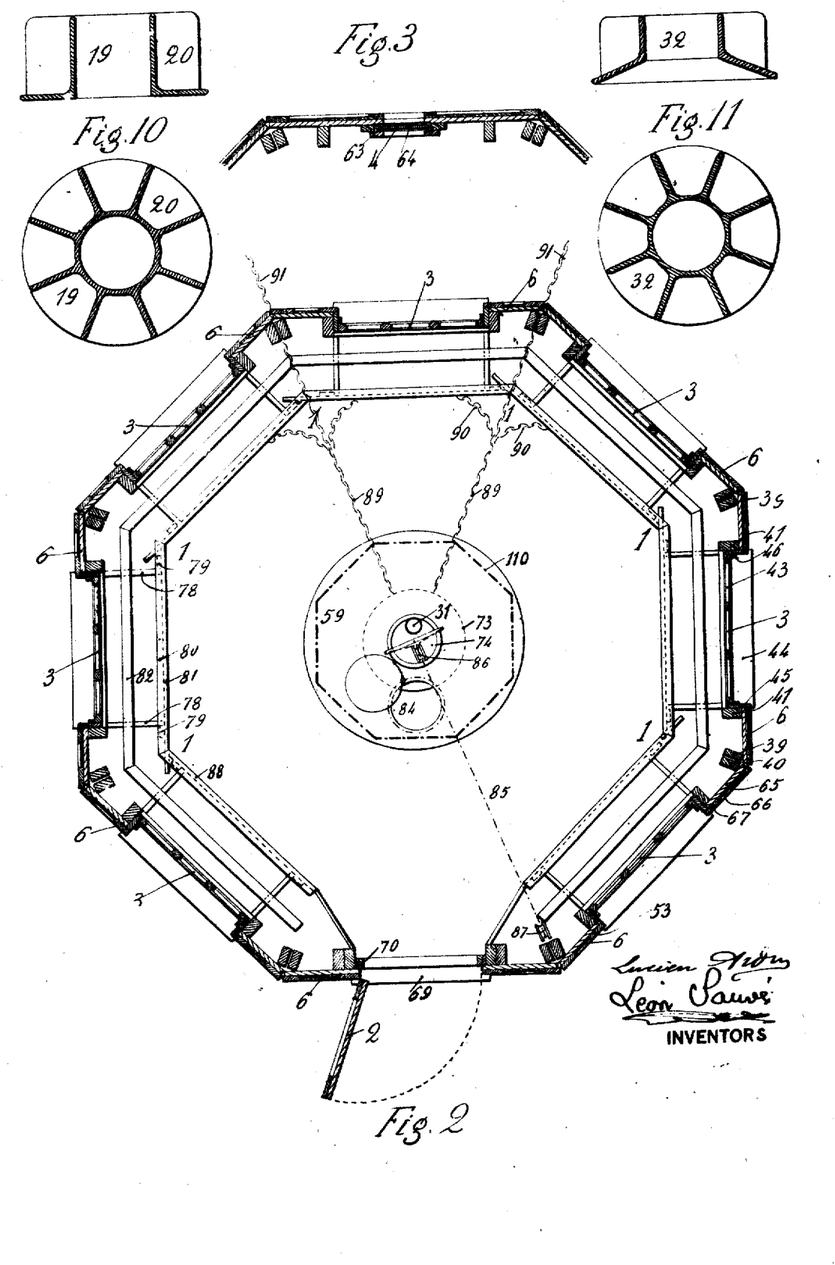
Fig. 2 represents a horizontal section of the brooder at the height of the windows.
Fig. 3 is a detail of the traps or small door placed under each window.
Fig. 10 is a view of a cast iron piece used in the center of the floor to secure and hold together the eight triangular sections of the floor.
Fig. 11 is a detail of the cast iron center pieces used for assembling the roof.
Figure 4:
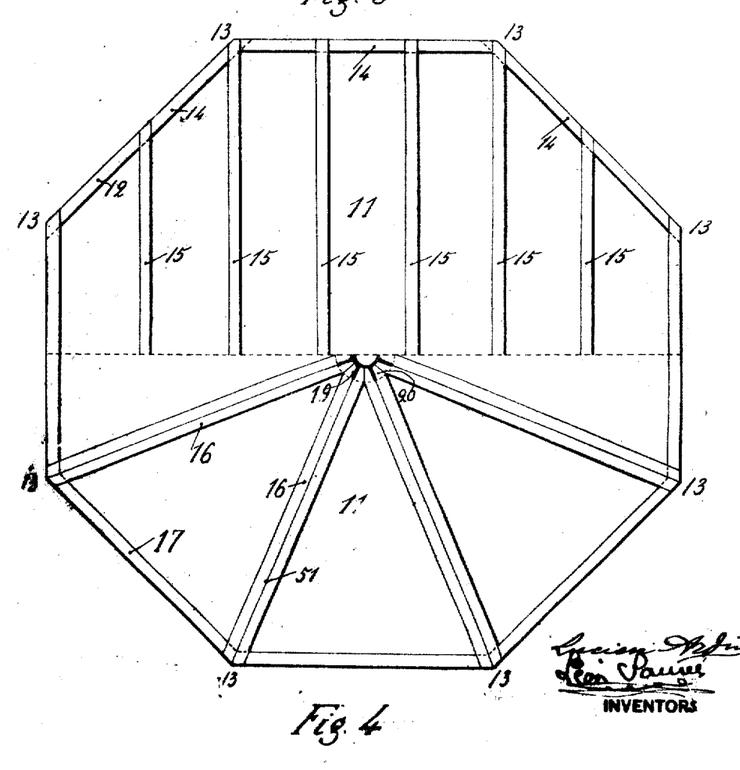
Fig. 4 is a plan of the frame of floor for a demountable or portable brooder shown at the bottom of the figure.
Figure 5:
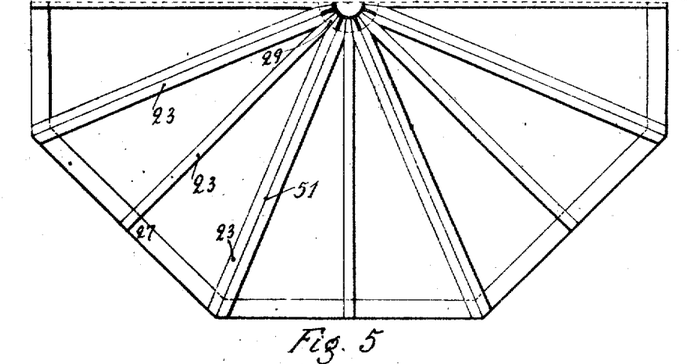
Fig. 5 represents one-half of the frame of the roof.

For the roof as for the floor in manufacturing on a large scale, the center part 30 is replaced by cast iron part 32 made especially for that purpose (Fig. 11).

The radiating wooden parts 23 forming the sides of two connecting triangles of the roof, are assembled by bolts with cotter pins 21, pressing on a sheet of asbestos 51 placed between the joints of the triangles.

Roofing materials of any kind are selected according to their availability in localities where the brooder is constructed.

Figures 7, 8:
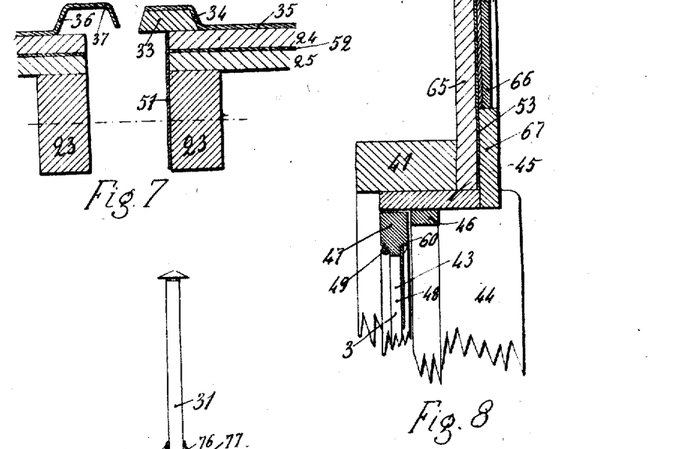
Fig. 7 is a detail of the joint of the panels of the roof when covered with metal, zinc, tin or sheet iron.
Fig. 8 is a detail of the edge of a window and of the jamb for the window.

For the portable brooder, and when using metallic roofing, four of the eight panels carry on their lateral sides a strip of wood 33 on which are shaped the sides 34 of the metallic sheet 35 of the roof. The metal sheets 36 of the four other panels are placed between the first four and are shaped as at 37 to cover the edges 34. The inside of the structure is thus well protected from snow and rain despite the portable method of construction of the panels, the strip 33 being sufficiently thick to offset the capillarity.

The sides. Between the floor and the roof are the vertical sides forming the principal body of the brooders. Each one of these sides has a frame to carry the other parts such as the exterior frame of the windows, etc.

The frame consists of a horizontal upper beam 38 fixed on two lateral uprights 39, 40 which rest on the edges of the angles of the floor. Two other uprights 41, 41 come down from the upper beam to the floor and, with two other small horizontal beams 42, 42, they frame the window 43.

The windows are made with a ledge 44 inclined outward and extending beyond the edge to prevent rain and water from coming in. They have a fixed frame made of boards 45 and strips 46. The frame 47 of the mobile part of the window rests against the strips 46.

The frame 47 is divided by cross, horizontal and vertical strips 48. The frame and strips are worked or shaped as at 49 and grooved as at 60, to receive the panes of glass, all of the same dimensions. The mobile part of the window is mounted on the fixed part 44 by two hinges 61 with a latch in the center of the upper part and it opens from the top inward, guiding the outside air toward the ceiling instead of descending while yet cold directly on the baby chicks.

The windows are arranged to open differently one from the other to fulfill the objects explained in the preamble. If it rains, they must be closed on the side where the wind blows and where the rain falls. If necessary the opposite windows can be opened. At certain hours the sun can be let in by certain windows or a frame with a thin cloth canvas can be placed on the outside of the windows, without interfering with their opening and closing, to regulate the admission of light. During the hot-weather months this canvas can act as a shade and the windows can be removed. Advantage may be taken of all the facilities afforded by the polygon shape adopted, with sides facing in all directions.

Below each window is a trap door or small door with frame 63 and a small sliding door 64 which can be opened or closed at will, as for instance to let the baby chicks go into any desired compartment of the yard according to the wind or the sun.

On the side of the frame are fixed two thicknesses of clapboards 65, 66. The boards 65 are grooved and tightened together, the shingles 66 are leveled and placed to rest one on the other to throw the rain outside, and are framed in by horizontal and vertical wood pieces 67.

Between the flooring 65 and 66 we place a sheet of asbestos, the purpose of which is explained above.

The end uprights of the two neighboring sides are brought together by screws with cotter pins 21 (Fig. 6) and a washer, which tightens a sheet of asbestos 51 to permit the sides being taken apart and put together rapidly. As shown, the floor, the roof and the sides of the brooder can be taken apart, removed and set up again quickly without damage.

The lower edges of the flooring 65, 66 come down below and around the floor, and when the sides are placed in position and the screws tightened, the whole building including the roof, and the beams 23 which are notched and which rest on a cross beam 38, is held secure and in place; it is unnecessary to use special fasteners, except in localities where great winds prevail and when exposed to them. Then we can fasten iron angles to the bottom of the uprights and the floor, 39 and 40, and on the pieces 38 and 23.

Figure 1:
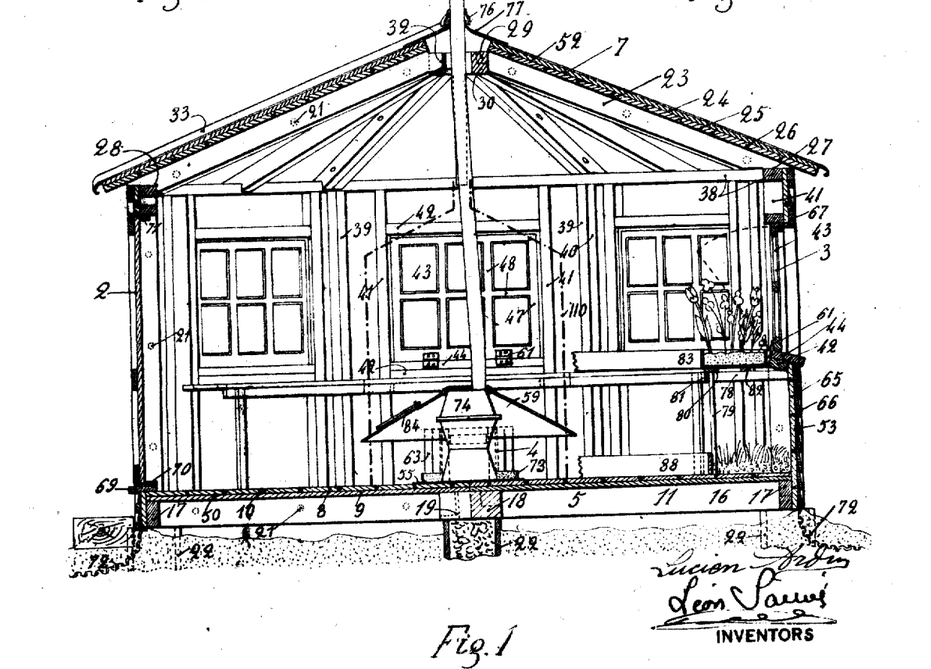
Figure 1 represents the brooder in vertical section.

Figures 1 and 2 show the door 2 and its frame, the step 69 and the strips 70, 71 against which the door sets and which prevents the outside air when too cold from entering directly, thus causing a draft on the baby chicks.

When setting up the brooder, one places between the bottom of the sides and the member 17 or 12, a close wire netting 72, said netting being placed sufficiently deep to prevent rats or vermin from entering the brooder.

Means are provided for heating the brooder. In the middle of the brooder on the floor is placed a metal box 73 resting on a sheet of asbestos 55. This box containing sand isolates the floor from the heating plant. The heating apparatus may be of any desired kind. It can be a coal stove like that shown in Fig. 1 of the drawing, or gas, oil, furnace or other forms of heaters may be used.

In the center of the brooder a movable metal cone 59 is placed. In this cone is a door 84 thru which the stove can be fed. The cone is movable and can be raised by the use of a string 85 working on pulleys 86, 87. It is counterweighted. It may thus serve to cover the stove or the stand of nests.

The chimney 31 leading from the heating plant, if there be one, will pass thru the center hole of the central fixture. Around the chimney a collar 76 is placed which covers another large collar 77. This large collar 77 is set on the roof. Weather vanes are placed on the chimney to indicate the direction of the wind. The covering of the collar 77 by the collar 76 prevents snow from entering but it leaves a little room for the very hot air to escape, which hot air always goes toward the upper angle of the roof when the windows and doors are opened or closed. When closed the fresh air enters by the small openings between the strips of the door and the windows.

Means are provided for placing plants out of reach of the chicks and for easy installation and removal. On each panel or side frame of the windows of the brooder are nailed two strips of wood 78 and these are fastened to two wooden legs 79 resting on the floor. These strips and their legs carry wooden strips 80, 81, 82. Upon said strips the boxes with plants rest. When the boxes are removed the strips 80, 82 serve as perches for the fowls. When taking the brooder apart, a set of strips corresponds to a panel, and goes with it. For this reason the strips 81 may have any length and must extend beyond the angle, or junction I between adjacent strips (see Fig. 2).

The plant boxes 83 rest around the brooder except in the door opening. They are low and far enough from the windows so as not to prevent their opening and closing. These boxes hold earth and seeds, flowers, and vegetables are sown therein and watered. This gives to the atmosphere, as has been said, the humidity, moisture and effluvia necessary to the health of the baby chicks and improves the air by inhalation. The temperature and atmosphere are similar to a hot house. The plants are placed high enough so as not to be interfered with by the chicks; and when developed are transplanted into the open.

After the chicks have grown to pullet size, the plant boxes are taken from the brooder and the strip supporting them becomes the perches. The brooder becomes a colony house. Later on it is changed into a laying house. For the last-named purpose a stand of nests is provided, which will be described later.

About ten or twelve days after the baby chicks have gone from the incubators to the brooder it is necessary whenever the weather permits, to let them go out into the open air in the yards, depending upon the sun or wind. etc. For this purpose trap doors are provided.

A small board 88 is placed against the legs 79 and makes it feasible to place ashes on the floor into which oats are mixed or placed. The mixture is then watered to cause germination for the same purpose and effect as the plants which are placed in the boxes, i. e. to produce humidity and effluvia in the atmosphere and to make fresh greens available and handy for feeding purposes.

As the chicks grow, the obstacle furnished by board 88 is increased by adding to it removable wire netting stretched on wooden frames.

If it is desired to raise several hatchings of different breeds of chickens or other poultry, in the same brooder, we place if necessary thin wire screens on light frames with rounded ends 90 in one or more of the eight directions radiating from the center to the edges of the frames of the panels. These frames are easily handled and enable us to divide the brooder in as many parts as desired.

The shape of the brooder provides for the use of trap doors for eight yards. The chicks can be confined in either compartment of the yard while the others are being cultivated, and can thus be kept moving continually.

Figure 9:
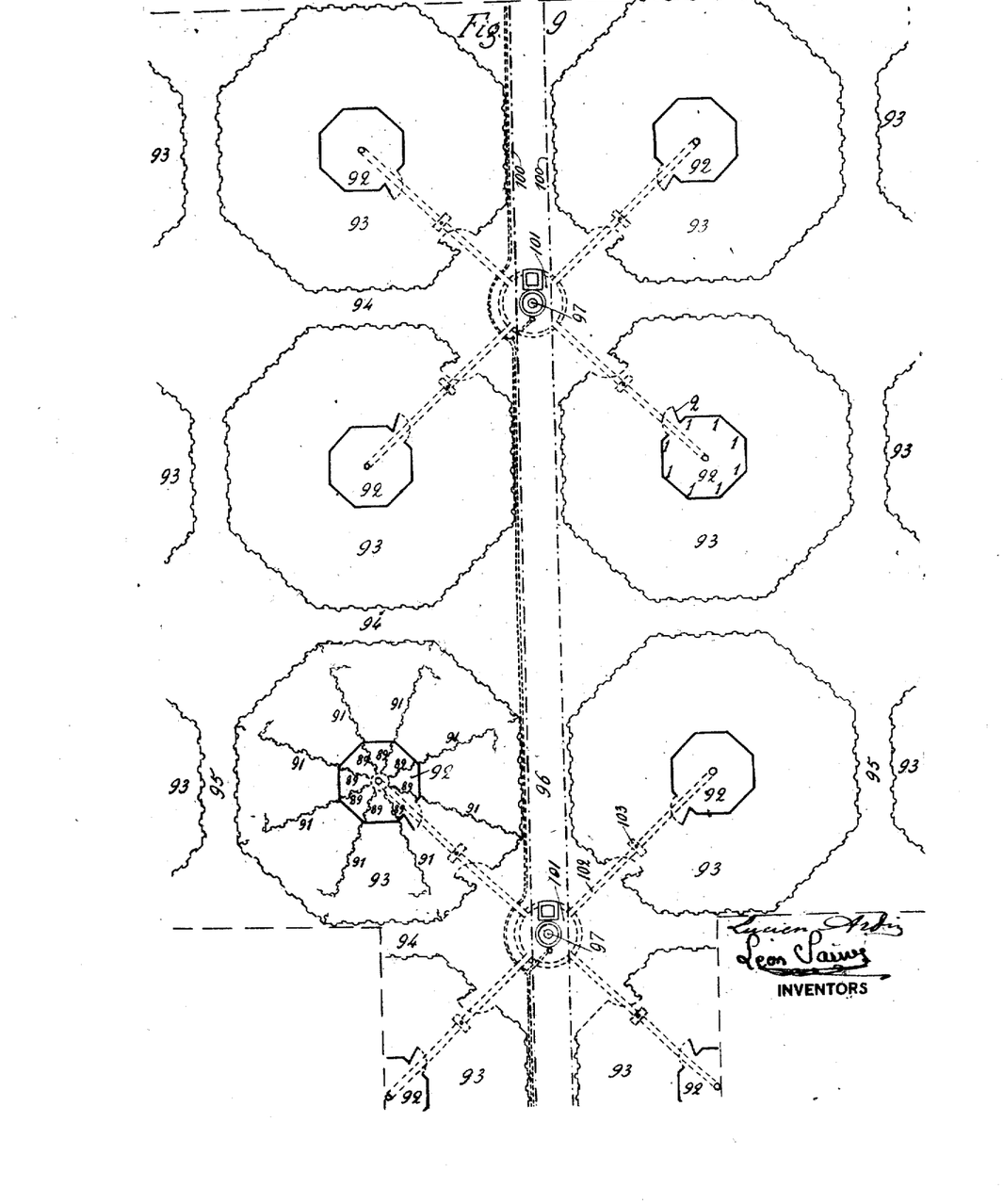
Fig. 9 is a general view of a large number of brooders.

When the brooders are a part of a big poultry raising plant and the magnitude of the plant necessitates many brooders, we group them preferably as shown in Fig. 9. Each brooder 92 is placed in the center of a yard 93 surrounded by small wiring at the bottom and larger wiring as we go higher. This yard has the same polygonal shape as the brooder.

The yards are grouped as shown by Fig. 9 so that between them we provide the relatively narrow alleys or walks 94 in the transverse or crosswise direction and 95 in the longitudinal or lengthwise direction. Every other longitudinal alley 96 is made wider, making them particularly easy of access. In all the alleys, wide or narrow, the ground is prepared to prevent the spread of disease and the contamination of one yard by the other. The walks permit the caretakers and attendants to freely move about the yard. Broken stones or coal ashes, mixed with antiseptics, are used for paving the walks.

Care must be exercised in the selection of the antiseptics lest they become a menace to the chicks by getting into their food. In the alleys 96 at every other octagon there is installed a distributing column 97 for feeding four brooders. Connected to each of these columns is a fountain with drinkable water fed by pipes buried under the alley sufficiently deep to prevent freezing. To these columns are harnessed, on the right and left at a man's height, carriers of a known system. The axes are indicated by dotted line 100. One carrier supplies the feed, the other is used for bringing coal, removing the manure and for handling the soil and ashes. At the bottom we place a small coal stove 101, supplying hot air or hot water for four brooders, which supply the heat by underground pipes 102, with automatic regulating valves 103.

We thus obtain isolation and separation of the brooders with less chance of epidemics. The cost of operation and labor are reduced and at the same time it looks attractive, neat, clean, and agreeable to visitors.

It is understood that supplies, such as water, food and fuel, altho brought from the square adjacent to brooders, are not distributed automatically by mechanical means, but by the skilled attendants.

In transforming the colony house into a laying house, the central heat plant can be discontinued, when other sources of heat such as natural heat in season, become available. In very cold weather the central heating plant furnishes an ample degree of heat, necessary for the well being of the fowl.

Figure 12:
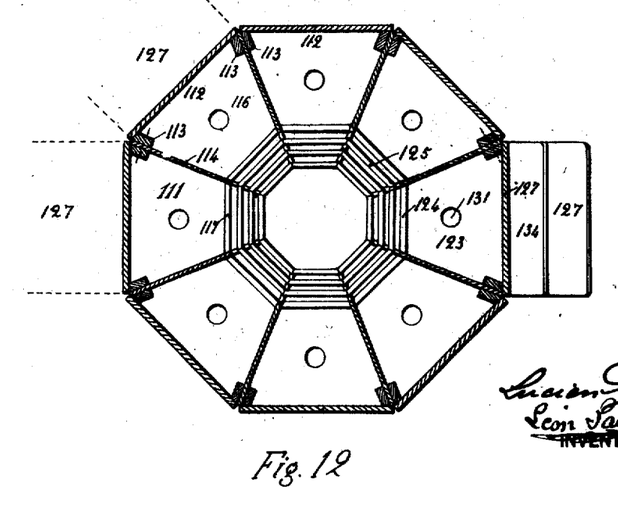
Fig. 12 is a plan in horizontal section, of the columnar stand of nests serving to transform the brooder into a laying house.
Figure 13:
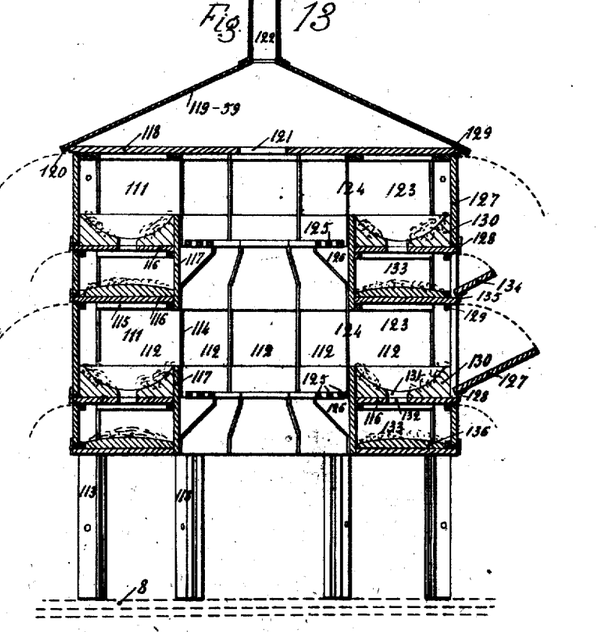
Fig. 13 is a vertical section of the stand shown in Fig. 12.

When using natural heat, during the laying season, a stand of nests can be placed in the center, as indicated in Figures 12 and 13, occupying the positions marked by heavy dotted lines 110 on Figures 1 and 2.

In the form of the invention illustrated, these stands have two stories or platforms of sixteen nests in all or eight on each platform. These stands are composed of eight elements 112, all alike, which can be rapidly assembled or dismounted, being connectible in pairs by means of keys to the posts 113. Each element or unit includes a panel 114 which separates the adjoining nests on the same floor, the panel being fastened to the posts 113 and being shorter than the posts so as to leave the feet of the posts free, with spaces between, thru which the fowls can pass and thus have free access to their nests, by jumping or flying upward thru the central opening.

The panels 114 carry, by means of strips 115 secured to the panels, horizontal boards 116 secured to the strips. The boards 116 are attached to every second post 113. These boards are also attached to the neighboring panel when the eight elements of the stand are assembled.

Small upright boards 117 are fastened to the flooring 116 and complete each unit. The posts or uprights rest on the floor 8. The stand is completed by covering it with flooring 118 resting on the uprights, and with a cone 119 edged by strips 120.

The angle of the incline of the cone is such as to hinder the fowls from roosting on it.

The dimensions adopted are such that if found desirable the cone 59 over the heating plant can be used to fill the purpose of the cone 119. The floor 118 has a hole 121 used to ventilate the stand of nests in combination with the chimney 122.

The stand has four stories and 32 compartments, 8 per floor. The upper portions 123 of each pair of these compartments are to be used as nests. They are continually opened at 124 on the side toward the center of the stand. Thru these openings 124 the chickens enter the nests aided by the use of the wooden strips such as 125, resting on brackets 126 which are parts of the panels 114 or attached to them.

Toward the outside each nest is closed by a mobile panel, a door, such as 127 playing on hinges 128 fastened on the lower edge, this door closing against the uprights 113 and the strips 129.

The nest itself consists of a hollow plaster block 130 made after the stand is in place. Such blocks can be made over again every season when the nests are taken apart.

The plaster block is nest-shaped, and before the plaster becomes hard tobacco stems are placed in it. When dry and hard the stems are bent to take the shape of the nest. A few pieces of camphor are also placed in the plaster as a protection against vermin.

At the bottom and center of the basin a hole 131 is left to correspond with a hole 132 made in the board 116. These holes are sufficiently large to permit the newly laid egg to roll and fall into compartment below 133.

An artificial egg is sealed for about one-third of its size, into the plaster.

The compartment 133 is completely enclosed by boards 117, arranged in the interior of the stand.

They open on the outside by doors 134 with hinges 135. These doors are used to gather the eggs from the compartments 133.

On the bottom 133 is laid a coating of plaster 136 treated as were the nests, but instead of being hollow, is convex and covered by any kind of cushion, thus forcing the egg to roll away from the hole 131 without breaking.

Referring now to the construction of the fences, which are made of panels easy to erect, to demount and to reset, and which separate the brooders and the yards into compartments, and constitute also the enclosure of the yard.

Figure 14:
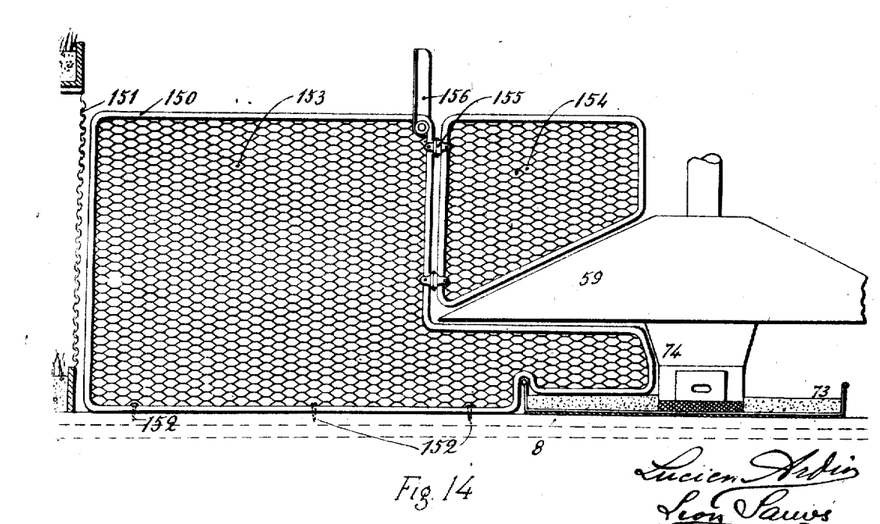
Fig. 14 is a detail of a fence or partition for the brooder.

For the separation of the brooders 89, we attach the wiring to frames 150, formed of round, bent and curved iron, varying its shape according to the heating apparatus in use. The frame runs radially from the heating equipments to the fence 151 mounted on a wooden frame which is attached against the plant boxes and the soil boards. The iron frame 150 is held in place by a few screws 152 to the floor 8 of the structure. It is very easy to demount and change. In the example illustrated the frame 150 follows the outline of the stove 74 and of its sand pan 73. It rises almost to the height of the flower boxes; that is to say, high enough to prevent the baby chicks from changing compartments and yet low enough for the caretaker to step over from one compartment into the next. The wire panel is composed of two distinct parts 153 and 154 assembled together by two hinges 155 allowing part 154 to fold back on part 153 when desirable to move or raise the cone 59.

A pivoted latch 156 when lowered, holds the two parts of the fence in line.

Referring now to the fence separating and enclosing the yards, this fence is mounted as the preceding one on bent, round iron curved frames 157 (Figures 17 and 18) which are themselves carried by iron tube framings. These framings can be easily mounted and demounted with everything pertaining to them. For this purpose each framing is composed of two horizontal tubes 158 and 159 secured at their extreme ends to cast iron sockets consisting of two bolted parts 160, 161, 162, 163 which are made to fit the angles between the frames forming the octagonal contour of the yards.

Figures 16, 17, 18, 19, 20, 21, 22, 23:
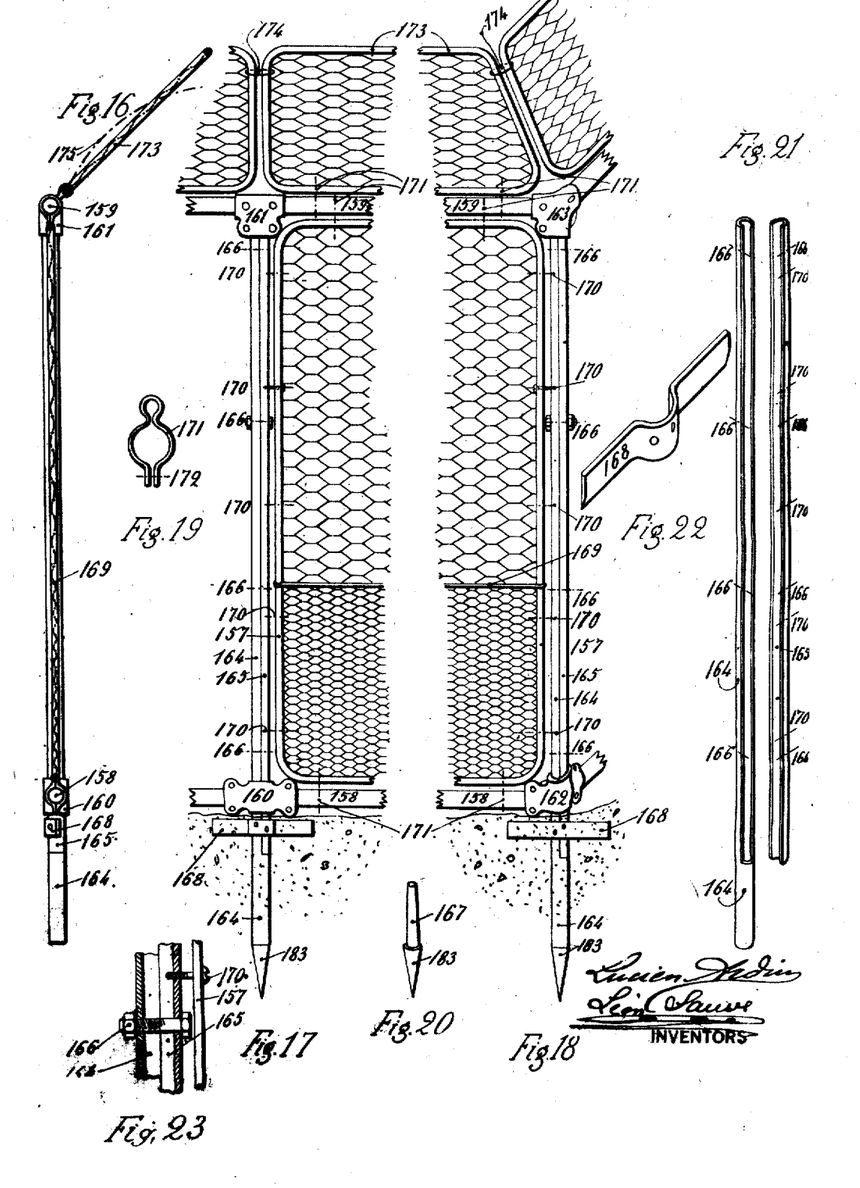
Fig. 16 illustrates a vertical, transverse section of the fencing enclosing the yard.
Fig. 17 illustrates a demountable panel for the fence enclosing the yard.
Fig. 18 illustrates an end panel of the fence.
Fig. 19 shows a detail of a hook or clasp for attaching the wire frames to the panel posts.
Fig. 20 illustrates a detail of the point of a vertical post for a panel.
Fig. 21 illustrates details of a vertical tubular post, split in two parts, for the demountable panels.
Fig. 22 shows details of a flat-plate for holding the vertical tubular post of a panel.
Fig. 23 is a detail showing the means for connecting the frames of the fence.

These sockets hold the horizontal tubes to the vertical tubes. Each vertical tube is composed of two half tubes 164 and 165 held together by bolts 166. To take them apart it is only necessary to loosen the sockets 161 to 163 and to unscrew the bolts 166. One half of the tube forms part of the one frame, and the other half is part of the next frame.

One half of a tube 164 extends lower than the half 165 and this lower part takes the shape of a complete tube into which is forced the end 167 of a cast iron stem 183 (Fig. 20). This is tapered or pointed and easily penetrates the soil. A flat iron part 168 is screwed to the two parts 164 and 165 of a tube; it helps to connect them and forms a horizontal cross, sunk in the soil a little below the level of the ground, and holds the tube firmly in vertical position.

Figure 15:
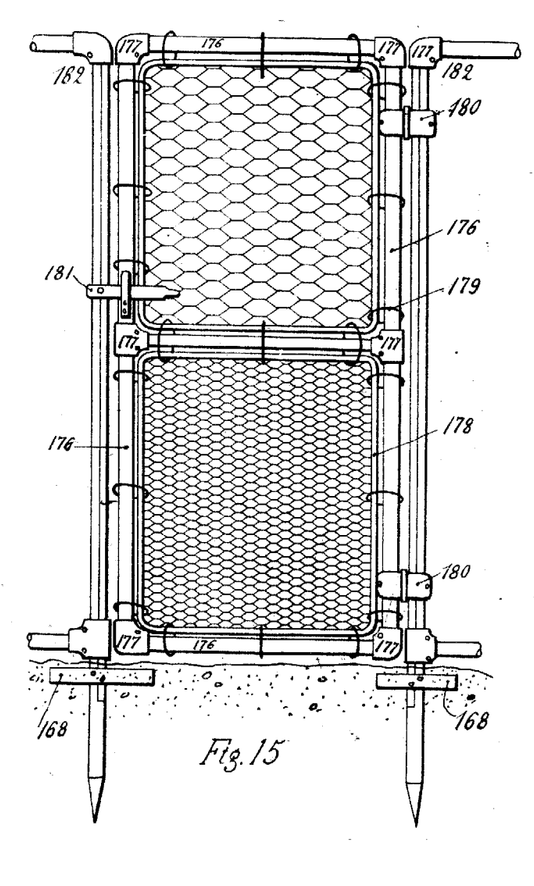
Fig. 15 illustrates a door opening into a chicken yard, or connecting one compartment of the yard with another.

The inner frame 157 can carry the same wiring from top to bottom, or fine netting at the bottom and coarser at the top, the ends being connected to a thick iron wire 169. The frame 157 is screwed to the half tubes 165, 164 by screws 170. These need not be unscrewed when taking down the fence but can be unscrewed to facilitate repairing the frame. The frames are attached to the horizontal tubes by spring clasps 171 (Fig. 19), tightened by a bolt 172 which need not be taken apart when dismounting. Above the upper horizontal tube 159 of each frame is placed a frame of round iron, 173, filled preferably with coarse netting. This frame is placed leaning toward the yard and prevents the chickens from flying above the enclosure of the yards. These frames are attached to the tubes 159 by clasps 171, and are connected with thin wires 174 after setting them up. The frames 173 can be shaped flat or curved as at 175. The doors used to go into the yards or to go from one compartment into another are illustrated in Fig. 15. The door itself is made of a framing of iron tubing 176, assembled by standard connections 177 into which are placed the wire frames with circlets 179 of thin wire. The door is provided with two hinges 180 and the lock 181. The plates 168 make it unnecessary to connect, above the door, the angle irons of the fixed part of the enclosure. A man carrying a load can thus easily pass thru.

It is also understood that the details of construction can be modified, maintaining the principles of the invention, without departing from its spirit.

What we claim as new and desire to secure by Letters Patent is:

1. A combined brooder and greenhouse comprising a house for raising chicks, the house being of polygonal shape, and having its sides and roof formed of separable sections, one of the sides having a door to permit the entrance of the attendant a central heater within the house for heating it, a plurality of boxes arranged around the inside of the house and adjacent to the sides, for receiving soil for growing plants, means for supporting said boxes out of reach of the chicks, and radial division panels extending from said boxes to said central heater each of said panels rising above said floor the tops of the panels being below said boxes and the height of the panels permitting the attendant to step over them.

2. A combined brooder and greenhouse comprising a house of polygonal shape for raising chicks, said house having a door permitting the entrance of an attendant, a central heater within said house, said heater being spaced from the sides of the house, a plurality of boxes arranged around the inside of the house one at each side and adapted to receive soil for growing plants, means for supporting said boxes out of reach of the chicks, and means for providing a soil compartment on the floor of said house beneath said boxes, adapted to grow grain.

3. A convertible combined brooder, greenhouse and laying house comprising a polygonal booth with a plurality of sides, one of the sides having a door admitting an attendant, a central heating apparatus within said booth, said heater being spaced from the sides and means carried by said sides for supporting above the floor a plurality of window boxes for growing plants, one for each side, said boxes being arranged upon the inside and around the sides of the said house, division plates between said heater and said boxes, each of said plates being of a height that will permit the attendant to step over it, and a centrally arranged movable canopy with inclined top above said heater, said canopy extending to said division plates.

4. A combined brooder and greenhouse for raising chicks, comprising a building with polygonal sides, each side provided with a window and the said sides being connectible so as to form the wall of the house, each side provided with a window box adjacent to the window and on the inside of the house adapted to grow plants, means for supporting said boxes out of reach of the chicks, and a stove centrally located within the house for heating it, said stove being spaced from the sides so as to permit space for the chicks and the attendant.

5. A combined brooder and greenhouse made up of a plurality of radial sections, each section comprising a side carrying a window, a triangular floor-piece and a triangular roofing unit, one of the sections having a side carrying a door to admit the attendant, and means for assembling the sections so as to form a polygonal booth.

6. A combined brooder and greenhouse made up of a plurality of radial sections, each section comprising a side carrying a window, box supports which are adapted to serve as perches beneath said windows, a removable window box for soil adjacent to said window, mounted upon said supports, a triangular floor-piece and a triangular roofing unit, the sections being adapted to be assembled so as to form a polygonal booth.

7. A combined brooder and greenhouse built in sections so as to form a polygonal booth when assembled, each section comprising a radial floor section, a side frame and a triangular roofing frame, each side frame carrying a window and strips serving as perches and as window box supports, and a removable window box and means for detachably securing adjacent side frames together.

8. A combined brooder and greenhouse comprising a building with polygonal exterior, comprising a plurality of sides, each side provided with a window, means for hinging said window at the bottom so as to swing on a horizontal axis and toward the inside of the house, the said sides being connectible so as to form the wall of the house, and one or more of the sides provided with window box supports forming perches and a window box carried by said supports and below the window for growing plants.

9. A combined brooder and greenhouse made up of a plurality of radial sections, each section comprising a side carrying a window, said window being pivoted below on a horizontal axis and adapted to swing inward, a sectional floor-piece and a sectional roofing unit, the sections being adapted to be assembled so as to form a polygonal booth, each window side carrying perch strips, and a plurality of removable boxes supported by the perch strips for growing plants within the house.

10. A combined brooder and greenhouse made up of a plurality of radial sections, each section comprising a side carrying a window and one of said sides provided with a door beneath said window, said windows being adapted to swing inward, a sectional floor-piece and a sectional roofing unit, the sections being adapted to be assembled so as to form a polygonal booth, each window side carrying perches, and a plurality of removable boxes carried by the perches for growing plants within the house.

11. A combined brooder and colony house of polygonal shape built in radial sections, each section comprising a side frame carrying a window, a roof section and a floor section and means for converting the brooder into the colony house comprising a system of removable radial partitions adapted to be mounted upon the floor of the house and to radiate from a zone near the center to a zone near the periphery of the house, the height of the partitions being such so as to permit the attendant to step over them.

12. A combined brooder and colony house of polygonal shape built in radial sections, each section comprising a side frame carrying a window, a roof section and a floor section and means for converting the brooder into the colony house comprising a system of radial partitions adapted to be mounted upon the floor of the house and radiate from a zone near the center to a zone near the periphery of the house, one section provided with a door for permitting the chickens to pass from the house into the yard.

13. A combined brooder and greenhouse of polygonal shape whose outside wall comprises a plurality of sectional frames adapted to be connected together at their adjacent sides, supports attached to one or more of said side walls, said supports serving as a means for supporting removable boxes for growing plants and also serving as perches for the fowls after the removal of the boxes.

14. A combined brooder and greenhouse made in sections adapted to be assembled and disassembled so as to give the house a polygonal form when assembled, each section comprising a side frame, perch and window box supports carried by the side frames a roof portion and a floor portion, said sections radiating from a central axis and means for joining the centers of said roof and floor portions, said means comprising a center plate with which the inner ends of the roof portions connect and a floor centerpiece with which the inner ends of the floor portions connect.

15. A combined brooder and greenhouse which can be transformed into a colony house and into a laying house, a stove at the center of the house, a plurality of dividing frames for dividing the brooder into radial compartments, to convert it into a colony house, each of said frames carrying a netting, said frames being removably secured to the floor of the brooder and being shaped to conform at their inner ends to the stove, each of said frames rising above said floor to a height permitting the attendant to step over them.

16. A polygonal brooder made up of a plurality of radial sections, each section excepting one including a side carrying a window, the remaining side carrying a door for the attendant, each section also including a triangular floor-piece and a triangular roofing unit and bolts and cotter-pins for assembling and tightening the sections.

In testimony whereof we have signed our names to this specification.

LÉON SAUVÉ.
LUCIEN ARDIN.